(12) United States Patent
Henson et al.

(10) Patent No.: US 8,189,314 B2
(45) Date of Patent: May 29, 2012

(54) CURRENT IN-RUSH LIMITING CIRCUIT USING SWITCHABLE CURRENT LIMITING ARRANGEMENT

(75) Inventors: James C. Henson, Annandale, NJ (US); Peter Volpa, Hammonton, NJ (US)

(73) Assignee: Siemens Industry, Inc., Apharetta, GA (US)

( * ) Notice: Subject to any disclaimer, the term of this patent is extended or adjusted under 35 U.S.C. 154(b) by 192 days.

(21) Appl. No.: 12/623,081

(22) Filed: Nov. 20, 2009

(65) Prior Publication Data

US 2010/0165519 A1 Jul. 1, 2010

Related U.S. Application Data

(60) Provisional application No. 61/117,354, filed on Nov. 24, 2008.

(51) Int. Cl.
*H02H 9/08* (2006.01)
*H02H 3/08* (2006.01)
*H02H 9/02* (2006.01)

(52) U.S. Cl. ...................... 361/93.9; 361/93.1

(58) Field of Classification Search ............ 361/93.9, 361/93.1; 323/908, 93.1
See application file for complete search history.

(56) References Cited

U.S. PATENT DOCUMENTS 7,304,456 B2 * 12/2007 Temesi et al. ............... 323/222

* cited by examiner

*Primary Examiner* — Dharti Patel

(57) ABSTRACT

An apparatus includes first and second input terminals, a conversion circuit, a current limiting resistive device, a triac and a second winding. The first and second input terminals are configured to be connected to a source of input power. The conversion circuit is operably connected to the first and second terminals, and includes a first inductive winding coupled between the first terminal and a switching device. The conversion circuit also includes a rectifier coupled between the first inductive winding and a first output, and a capacitor coupled between the first output and circuit ground.

20 Claims, 3 Drawing Sheets

CURRENT IN-RUSH LIMITING CIRCUIT USING SWITCHABLE CURRENT LIMITING ARRANGEMENT

This application claims the benefit of U.S. Provisional Patent Application Ser. No. 61/117,354, filed Nov. 24, 2008, which is incorporated herein by reference.

FIELD OF THE INVENTION

The present invention relates to power supplies, and more particularly, to current in-rush limiting circuits for use in connection with power supplies.

BACKGROUND

In distributed building systems it is known for power supplies of building system devices to be connected to a source of electrical power through a circuit breaker. Such power supplies have a characteristic of creating an in-rush current surge at start-up. When multiple power supplies are energized via a single circuit breaker contact, the overall current surge due to in-rush can create a current flow that is ten times the steady state current requirement.

In particular, many power supplies include an output capacitor that provides a DC output supply voltage during normal operation. During start-up, the capacitor acts as a short circuit temporarily, drawing excess current. This temporary current is referred to as in-rush current.

A consequence of such power supply in-rush current is that the circuit breakers can become overloaded and erroneously interrupt the circuit. There is a need for an arrangement that can reduce the likelihood of erroneous interruption of circuit that provides power to multiple power supplies of building system devices.

SUMMARY OF THE INVENTION

At least some embodiments of the present invention address the above stated need, as well as others, by providing a power supply circuit that includes an in-rush limiting arrangement. Some embodiments address the need by providing such an in-rush limiting arrangement and/or related method.

A first embodiment is an apparatus that includes first and second input terminals, a conversion circuit, a current limiting resistive device, a triac and a second winding. The first and second input terminals are configured to be connected to a source of input power. The conversion circuit is operably connected to the first and second terminals, and includes a first inductive winding coupled between the first terminal and a switching device. The conversion circuit also includes a rectifier coupled between the first inductive winding and a first output, and a capacitor coupled between the first output and circuit ground.

The second winding is inductively coupled to the first inductive winding. The triac has a control input operably coupled to the second winding, and also has a load path series-coupled between the second input terminal and circuit ground. The current limiting resistive device is operably coupled between the second input terminal and circuit ground.

A second embodiment is an apparatus that includes a power converter, a current limiting resistive device, and a first circuit. The power converter is operably connected to the first and second terminals. The power converter includes a first inductive winding and a switching device. The power converter also includes a path that forms a low impedance path to ground when voltage is first applied to the first and second input terminals. The current limiting resistive device is operably coupled between the second input terminal and circuit ground. The first circuit is configured to bypass the current limiting resistive device at a time that corresponds to the time when the path has a high DC impedance, some time after voltage is first applied to the first and second input terminals.

Another embodiment is a power conversion circuit that includes a bridge rectifier, a conversion circuit, a second winding, and a semiconductor switching device. The ridge rectifier is configured to be connected to a source of AC power, and has first and second bridge outputs. The conversion circuit is operably connected to the first and second bridge outputs. The conversion circuit includes a first inductive winding coupled between the first bridge output and a switching device. The second winding is inductively coupled to the first inductive winding. The switching device has a control input operably coupled to the second winding, and has a load path series-coupled between the second bridge output and circuit ground. The power conversion circuit also includes a current limiting resistive device operably coupled between the second bridge output and circuit ground.

The above described features and advantages, as well as others, will become more readily apparent to those of ordinary skill in the art by reference to the following detailed description and accompanying drawings.

DETAILED DESCRIPTION

Figure 1:
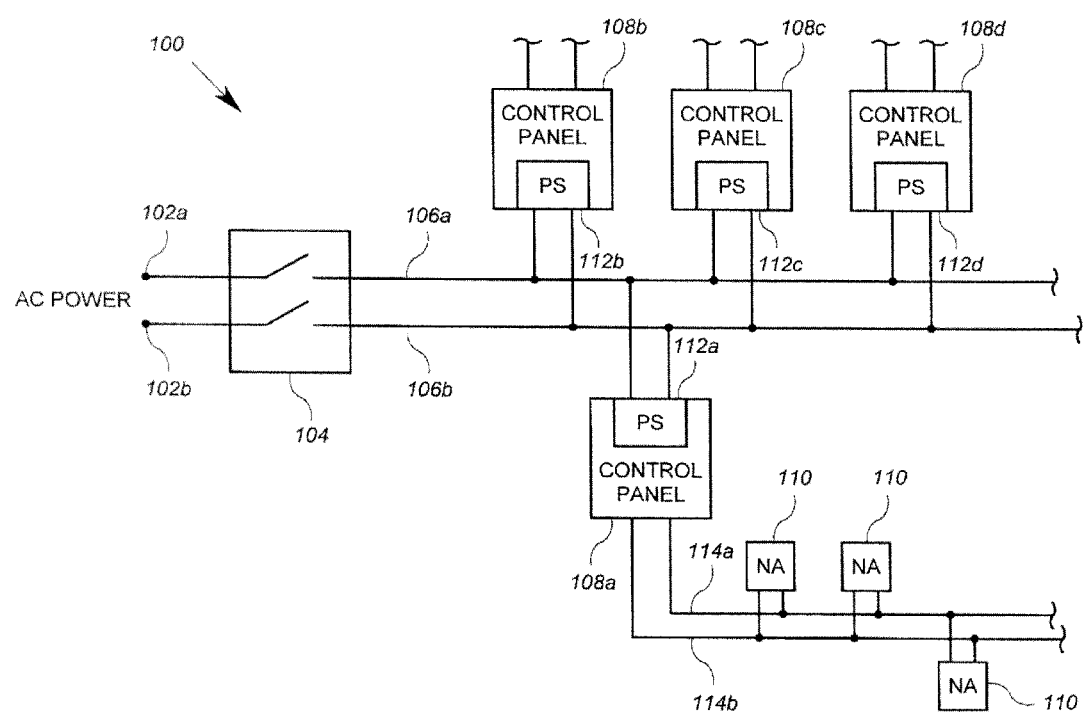
FIG. 1 shows a schematic block diagram of a portion of a building system 100 in embodiments of the present invention may be implemented.

FIG. 1 shows a portion of a building system 100 in embodiments of the present invention may be implemented. In this non-limiting example, the building system portion 100 is part of a fire safety system. The inventive aspects discussed herein may readily be implemented in other building systems with any required modifications made by those of ordinary skill in the art.

The building system portion 100 includes inputs 102a, 102b to a source of AC power. The source of AC power may be utility power, power generated on-site, or utility power that has been modified for use in the building system portion 100. The building system portion also includes a magnetically operated circuit breaker 104, power bus lines 106a, 106b, a plurality of control panels 108a, 108b, 108c and 108d, and a plurality of notification appliances 110.

The control panel 108a includes a power supply 112, and is connected to the plurality of notification appliances 110 via signaling lines 114a, 114b. In general, the control panel 108a includes circuitry that provides signaling information as well as bias power, typically on the order of 24 volts DC, to the notification appliances 110. Such circuitry for control panels is known in the art. The notification appliances 110 are devices typically used in a fire safety system to generate audible and/or visual alarm notification to occupants of a building. The notification appliances 110 can include loudspeakers, audible alarm devices, strobes, etc., particularly those designed for fire-signaling purposes.

The control panel 108a controls the operations of the notification appliances 110 to selectively and controllably generate audible and/or visual output. The control panel 108a causes the notification appliances 110 to generate such output responsive to information representative of the presence of a safety alarm condition. The control panel 108a may suitably receive such information from afire safety data network, or from a sensor device or other input, not shown, but which would be known by those of ordinary skill in the art.

The power supply 112 of the control panel 108a is a circuit that is configured to receive electrical power from the bus 106a, 106b and produce bias power for the control circuitry, not shown, of the control panel 108a, and bias power used to provide power to the notification appliances 110 over the signaling lines 114a, 114b. In accordance with embodiments of the present invention, the power supply 112 includes an arrangement for limiting the in-rush current caused by the large capacitor of the power supply 112. An exemplary embodiment of the power supply 112 is discussed below in connection with FIG. 2.

The control panels 108b, 108c and 108d may suitably be similar in structure and function to the control panel 108a, and may further be connected to additional notification appliances, not shown, and/or other types of devices, also not shown, which are powered and controlled within a power safety system. Preferably, each of the control panels includes a power supply 112b, 112c, 112d similar to the power supply 112a, that is, incorporating an arrangement for limiting in-rush current.

In operation, the building system portion 100 starts in an off-line state in which the circuit breaker 104 is an open state. As a consequence, no power is provided to the bus 106a, 106b, and no power is therefore provided to the power supplies 112a, 112b, 112c and 112d. The circuit breaker 104 may be closed to place the building system portion 100 on-line.

When the circuit breaker 104 is closed, the power supplies 112a, 112b, 112c, and 112d receive power. Due to the internal power supply circuitry, not shown in FIG. 1, there is an elevated current in-rush when power is first provided to the power supplies 112a, 112b, 112c and 112d. However, circuitry within the power supply 112a (and preferably within power supplies 112b, 112c and 112d), the in-rush current is limited. To this end, as will be discussed below in detail in connection with FIG. 2, the circuitry within the power supply 112a connects a current limiting resistor between circuit ground and the bus 106b. When the power supply 112a is powered up, then the current limiting resistor is bypassed. In the embodiments described herein, the circuitry employs a triac to carry out the current limiting resistor bypass.

During normal operation, the current draw of the power supplies 112a, 112b, 112c and 112d reverts to steady state operation and the building system portion 100 otherwise operates in a manner known in the art.

Figure 2:
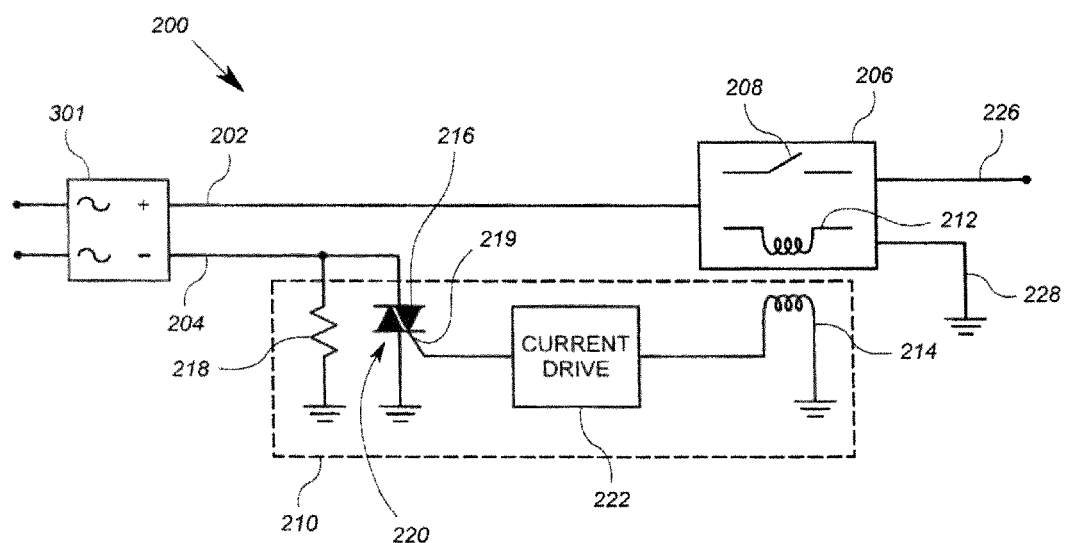
FIG. 2 shows a schematic block diagram of an exemplary power supply according to an embodiment of the invention.

FIG. 2 shows a schematic block diagram of a power supply 200 according to an embodiment of the invention. The power supply 200 may suitably be used as the power supply 112a of FIG. 1.

The power supply 200 includes first and second input terminals 202, 204, a conversion circuit 206, and a current limiting arrangement 210. The first and second input terminals 202, 204 are operably coupled to abridge rectifier 301, which in turn is connected to a source of AC power. For example, the bridge rectifier 301 may suitably be coupled to the bus lines 106a, 106b of FIG. 1. The positive and negative output connections of the bridge rectifier 301 constitute, respectively, the input terminals 202 and 204.

The conversion circuit 206 is a circuit that performs a conversion to a DC level at the terminals 226 and 228, with the terminal 228 representing circuit ground. As is known in the art, the conversion circuit 206 may be a boost converter. In some embodiments, the conversion circuit 206 is a boost converter that performs power factor correction. In such an embodiment, the terminal 226 may then connect to another DC-to-DC converter, not shown. It will be appreciated that the invention may readily be adapted to any converter, including DC-DC switched mode power supplies, buck converters, and the like.

Figure 3:
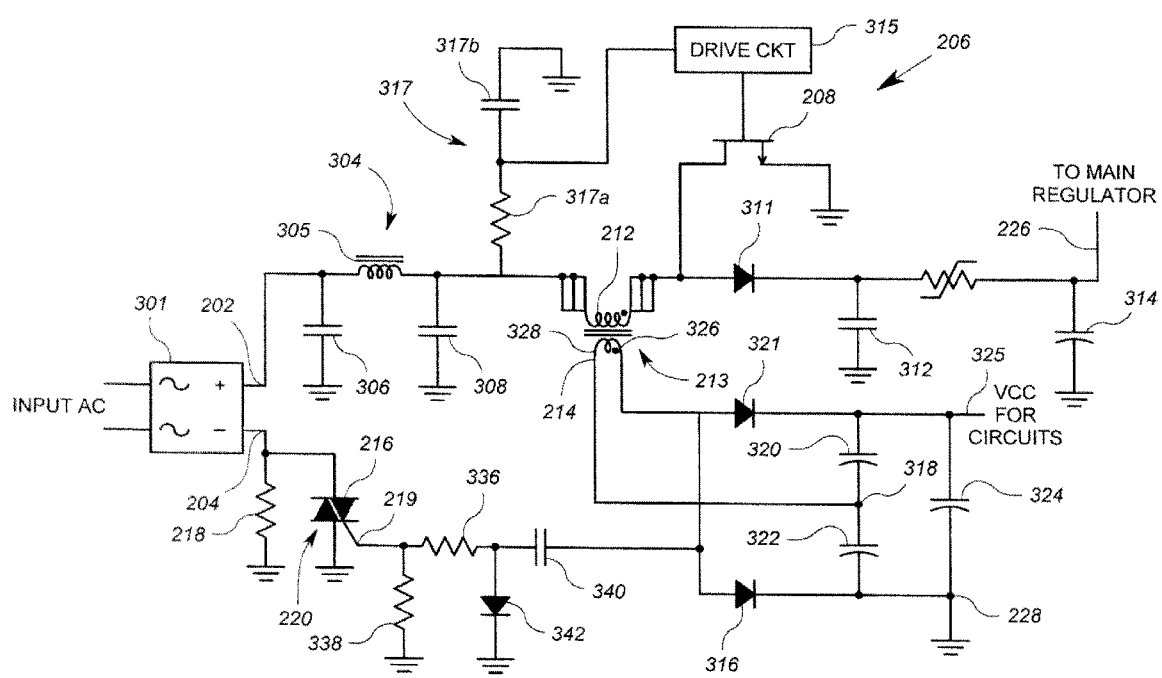
FIG. 3 shows an exemplary embodiment of the circuit FIG. 2 in further detail.

Regardless of the type of conversion circuit 206, the conversion circuit 206 includes an inductive winding 212 and a switching device 208. The switching device 208 is used for switched-mode power conversion as is known in the art. Many types of conversion circuits are known that include such devices, including various types of boost converters. The primary winding 212 is typically operably coupled to the first input terminal 202. FIG. 3 shows an example of a boost converter that may be employed as the converter circuit 206.

The current limiting arrangement 210 is a circuit that operates to limit the in-rush current when power is first provided to the input terminals 202, 204. In this embodiment, the current limiting arrangement 210 includes an inductive winding 214, a current-controlled device 216 and a current limiting resistor 218. The inductive winding 214 is inductively coupled to the inductive winding 212 of the converter 206. The inductive windings 212 and 214 may suitably be in the form of a transformer. In the embodiment described herein, the transformer formed by the inductive windings 212 and 214 is a "high frequency" transformer that couples through signals having a frequency on the order of the switching frequency of the switching device 208 when the conversion circuit 206 is operating. Low frequencies in the range of the AC line frequency are substantially blocked, or in other words, are not coupled from the winding 212 to the winding 214. Use of such a transformer allows for smaller transformer magnetic and size.

The current-controlled device 216 is a semiconductor device or other device that has a control input 219 operably coupled to the winding 214, and includes a load path 220 series-coupled between the second terminal 204 and circuit ground 228. The current-controlled device 216 operates to block current from flowing through the load path 220 until a suitable bias current is provided to the control input 219. In this embodiment, the current-controlled device 216 is a triac. A triac has the characteristic of remaining in the conducting state after being turned on as long as there is a threshold amount of current in the load path, at least in the embodiment described herein.

A current drive circuit 222 may be provided to ensure that the control terminal 219 of the triac 216 has the sufficient current flow for activation. As will be discussed below in connection with FIG. 3, the current drive circuit 222 may suitably include a clamp circuit that clamps the peak voltage received from the winding 214 near ground, such that the triac 216 can be activated with a negative current flow.

The current limiting resistor 218 also is also operably coupled between the second terminal 204 and circuit ground 8.

The operation of the power supply 200 of FIG. 2 will be described with respect to a transition from astute in which power is not available at the input terminals 202, 204 to a state in which power is provided at the input terminals 202, 204. This transition in prior art devices typically resulted in substantial in-rush current while the power supply 200 moves toward a steady state operation. Such in-rush current resulted from temporary short circuit behavior of elements of the conversion circuit 206.

In particular, as power is initially provided to the input terminals 202, 204, an current path is typically defined through at least one capacitor within the conversion circuit 206. Typically a conversion circuit includes a smoothing output capacitor, not shown in FIG. 2. Such a capacitor temporarily acts as a short circuit, thereby causing potential in-rush current. As will be discussed below, the current limiting arrangement 210 substantially reduces this in-rush current phenomenon.

To this end, in the initial unpowered state, the output path 220 of the triac 216 is in a non-conducting state because no bias current is available at the control input 219. As a consequence, the in-rush current path through circuit ground 228 must travel through the current limiting resistor 218 to complete the circuit back to the input terminal 204. The current limiting resistor 218 limits the current by providing in impedance over which the input voltage is dropped.

As the conversion circuit 206 starts operating, after the in-rush current time period has substantially elapsed, the switching device 208 begins to switch at the switching frequency, thereby causing a relatively high frequency signal to pass through the winding 212. The high frequency signal is also passed through the magnetic/inductive coupling of to the winding 214. The secondary winding 214 provides the resulting signal to the control input 219 of the triac 216 via the current drive circuit 222.

The control signal provided to the control input 219 causes the load path 220 of the triac 216 to transition to a conductive state. When the load path 220 is conductive, circuit ground 228 is connected directly to the second input terminal 204. Because the load path 220 of the triac 216 is effectively non-resistive, or at least has a resistance that is much lower than the current limiting resistor 218, the load path 220 effectively bypasses the current limiting resistor 218 in the conductive state.

The current limiting arrangement 210 thus provides a current limiting resistor 218 that effectively limits current between circuit ground 228 and the second input terminal 204 until the bypass formed by the triac load path 220 is enabled. The load path 220 of the triac 216 is enabled after the conditions tending to create an in-rush current have largely expired.

The coincidence of the enabling of the load path 220 and the reduction in in-rush current is not accidental. As will be illustrated in the example of FIG. 3, discussed below, the same conditions that create the in-rush current also cause little or no bias voltage to be available for the operation of the conversion circuit 206. Thus, the conversion circuit 206 only activates, and thus the switching device 208 begins switching at a high frequency, after the temporary short circuit condition starts to decay. In turn, the high frequency transformer formed (at least in part by) windings 212 and 214 block any signals from passing from the winding 212 to the winding 214 until the high frequency switching is generated by the conversion circuit 206.

Thus, it is only after the conversion circuit 206 starts up that the winding 214 obtains a signal that can be used to turn on the triac 216. The conversion circuit 206, in turn, only starts up once the in-rush current condition is alleviated. As a consequence, the bypass formed by the triac 216 only becomes active after the in-rush current condition has terminated.

FIG. 3 shows a first detailed embodiment of the circuit 200 of FIG. 2. Like reference numbers are used to denote similar devices. In FIG. 3, the diode bridge 301 couples an AC line signal to the first input terminal 202 and the second input terminal 204. As discussed above in connection with FIG. 2, the outputs of the bridge 301 constitute the input terminals 202 and 204.

In this embodiment, the conversion circuit 206 is coupled to the input terminal 202 via a pi filter 304. The pi filter 304 includes an inductor 305 and capacitors 306 and 308. The pi filter 304 is configured as a low pass filter that prevents or inhibits frequency components, such as the switching frequency components generated by the conversion circuit 206, from propagating back to the AC power line.

In the embodiment of FIG. 3, the conversion circuit 206 includes the inductive winding 212, a rectifying diode 311, a capacitor 312, an output capacitor 314, the switching device 208, a drive circuit 315, and a start-up circuit 317. The conversion circuit 206 may suitably include other devices that provide feedback information to the drive circuit, and/or other components typical of a boost converter and/or power factor correction circuit.

In this embodiment, the winding 212 cooperates with the second winding 214 to form a transformer 213. The transformer 213 includes a core as is known in the art.

In FIG. 3, the power supply 200 further includes an additional power supply circuit coupled to the winding 214. This additional power supply circuit may be used to provide DC bias power to the various elements of the drive circuit 315. In particular, in the implementation of FIG. 3, the conversion circuit 206 is embodied as a power factor correction circuit, which is known in the art to produce a high DC output voltage. As such, the output 226 is typically connected to another DC-to-DC converter, not shown, but which reduces the voltage to usable levels. As a consequence, the DC output voltage at the output 226 is generally not usable by the drive circuit 315. Accordingly, the additional power supply connected to the winding 214 operates to generate low DC voltage for bias voltages of the conversion circuit 206.

In this embodiment, this additional power conversion circuit includes a full-wave rectifier/doubler circuit that includes a first diode 321, a second diode 316, anode 318, a first capacitor 320, a second capacitor 322, and a third capacitor 324. The first diode 321 is coupled and forward biased from a first terminal 326 of the winding 214 and the rectified output 325. The second diode 316 is coupled reverse-biased from the first terminal 326 of the winding 214 to circuit ground 228. The node 318 is coupled to a second terminal 328 of the winding 214. The first capacitor 320 is coupled between the node 318 and the rectified output 325. The second capacitor 322 is coupled between the node 318 and circuit ground 209b. The third capacitor 324 is coupled between the rectified output 325 and circuit ground 228.

FIG. 3 also shows an exemplary embodiment of the current drive circuit 222. In this embodiment, the current drive circuit 222 is embodied as a clamp circuit. The circuit 222 clamps the peak of the periodic signal produced by the winding 214 to a voltage near circuit ground. As a result, the opposing peaks of the signal are negative voltage peaks. In this embodiment, the transformer 213 is configured such that when the conversion circuit 206 is operating, a period signal of about 20 volts peak-to-peak is produced. Thus, the negative peaks generated by the current drive circuit 222 are on the order of −20 volts.

In the embodiment of FIG. 3, the clamp circuit or current drive circuit 222 includes a first resistor 336 coupled to the control input 219, and a second resistor 338 coupled between the control input 219 and circuit ground (e.g. 228). The current drive circuit 222 further includes a capacitor 340 that is series-connected between the first resistor 336 and the first terminal 326 of the secondary winding 214, and a diode 324 coupled between circuit ground and a point between the first resistor 336 and the capacitor 340.

Similar to FIG. 2, the operation of the power supply 200 of FIG. 3 will be described with respect to a transition from a state in which AC power is not available at bridge 301 to a state in which power is provided at the input terminals of the bridge 301.

In the initial unpowered state, the output path 220 of the triac 216 is in a non-conducting state because no bias current is available at the control input 219. As AC power is initially provided to the input terminals of the bridge 301, the bridge 301 generates a rectified AC signal which is provided to the terminals 202, 204. The rectified AC signal propagates to the capacitor 314 through the winding 212 and the diode 311. The capacitor 314, responsive to this transition, acts temporarily as a short circuit to ground 28.

In the meantime, the drive circuit 315 effectively has no power because the short circuit deprives the drive circuit 315 of any bias voltage. Thus, the signal propagating through the winding 212 is only the rectified AC signal as generated by the bridge 301. The frequency of the rectified AC signal is too low to be passed by the transformer 213. Accordingly, the winding 214 does not receive any signal via the coupling to the winding 212. Absent any signal, no control signal can be provided to the control input 319. Because the control input 319 has no bias signal, the circuit ground 228 is only coupled to the second terminal 204 via the current limiting resistor 218.

As the short circuit across the capacitor 314 decays, the voltage at the winding 212 increases. This voltage increase charges the start-up circuit 317, thereby energizing the drive circuit 315. The drive circuit 315 thereafter causes the switch 208 to operate in a high frequency switching manner.

The resulting high frequency switched signal then propagates through the transformer 213 to the secondary winding 214. The secondary winding 214 provides the propagated high frequency signal to the secondary power conversion circuit 314, 316, 320, 322, which in turn generates a bias voltage for the drive circuit 315 to supplant the voltage provided by the start-up circuit 317. The secondary winding 214 also provides the propagated high frequency signal, which in this embodiment is 20 volts peak-to-peak, to the capacitor 340. The capacitor 340 and diode 342 cooperate to clamp the signal such that the peak is approximately 0.5 volts (the forward drop of the diode 342), and such that the lower peak is approximately −19 or −20 volts.

The resistors 336 and 338 cooperate to ensure that an appropriate current is drawn from the control input 219, thereby energizing the triac 216. This control current provided to the control input 219 causes the load path 220 of the triac 216 to transition to a conductive state. When the load path 220 is conductive, circuit ground 228 is connected directly to the second input terminal 204. Because the load path 220 of the triac 216 is effectively non-resistive, or at least has a resistance that is much lower than the current limiting resistor 218, the load path 220 effectively bypasses the current limiting resistor 218 in the conductive state.

It will be appreciated that the current limiting arrangement of FIGS. 2 and 3 are not limited to use with fire safety systems, but may be used by any system that employs a power supply that is prone to in-rush current issues. For example, the current limiting arrangements of FIGS. 2 and/or 3 may be useful in power supplies used for computer server rooms or stations.

Moreover, it will be appreciated that while a preferred embodiment employs a current-controlled device in the form of a triac to implement the switchable bypass to the current limiting resistor 218, one skilled in the art may also use another device such as a MOSFET, IGBT or SCR. Suitable adjustments should be made to the current drive 222, particularly if a voltage driven device is employed.

It will also be understood that the current limiting arrangement may suitably also be employed in other voltage conversion devices that include some form of inductive winding. In such other embodiments, the power for the signal to trigger the bypass element (e.g. the triac 216) is obtained from another winding that is inductively/magnetically coupled to the inductive winding of the conversion device, similar to manner in which the winding 214 is coupled to the winding 212. Boost converters, buck converters, switched-mode DC to DC converters all include inductive windings which may be used to implement embodiments of the invention.

We claim:

1. An apparatus, comprising:
   first and second input terminals configured to be connected to a source of input power;
   a conversion circuit operably connected to the first and second terminals, the conversion circuit including a first inductive winding coupled between the first terminal and a switching device, a rectifier coupled between the first inductive winding and a first output, and a capacitor coupled between the first output and circuit ground;
   a second winding inductively coupled to the first inductive winding;
   a triac having a control input operably coupled to the second winding, the triac having a load path series-coupled between the second input terminal and circuit ground; and
   a current limiting resistive device operably coupled between the second input terminal and circuit ground.

2. The apparatus of claim 1, wherein the power conversion circuit includes a drive circuit having at least one switching frequency, the drive circuit operably coupled to drive the switching device.

3. The apparatus of claim 2, wherein the first inductive winding and the second winding form a transformer having a pass band that is above an input line frequency and includes the at least one switching frequency.

4. The apparatus of claim 1, wherein the capacitor creates a low impedance path to ground when voltage is first applied to the first and second input terminals.

5. The apparatus of claim 4, further comprising a bridge circuit configured to be coupled to a source of AC power, wherein a first bridge output forms the first input terminal and a second bridge output forms a second input terminal.

6. The apparatus of claim 1 further comprising a clamp circuit disposed between the second winding and the control input of the triac.

7. The apparatus of claim 1, wherein the conversion circuit comprises a power factor conversion circuit.

8. An apparatus, comprising:
   first and second input terminals configured to be connected to a source of input power;
   a conversion circuit operably connected to the first and second terminals, the conversion circuit including a first inductive winding coupled between the first terminal and a switching device, a rectifier coupled between the first inductive winding and a first output, and a capacitor coupled between the first output and circuit ground;
   a second winding inductively coupled to the first inductive winding;
   a triac having a control input operably coupled to the second winding, the triac having a load path series-coupled between the second input terminal and circuit ground;

a current limiting resistive device operably coupled between the second input terminal and circuit ground; and a clamp circuit comprising a capacitor series connected to between the control input and the second winding; and a diode coupled between circuit ground and a point between the control input and the capacitor.

9. An apparatus, comprising:

first and second input terminals configured to be connected to a source of input power;

a conversion circuit operably connected to the first and second terminals, the conversion circuit including a first inductive winding coupled between the first terminal and a switching device, a rectifier coupled between the first inductive winding and a first output, and a capacitor coupled between the first output and circuit ground;

a second winding inductively coupled to the first inductive winding;

a triac having a control input operably coupled to the second winding, the triac having a load path series-coupled between the second input terminal and circuit ground; and a current limiting resistive device operably coupled between the second input terminal and circuit ground;

wherein the second winding is further coupled to a second conversion circuit, the second conversion circuit comprising a first diode coupled between a first terminal of the second winding and a rectified output;

a second diode coupled between the first terminal of the second winding and circuit ground;

a node coupled to a second terminal of the second winding;

a first capacitor coupled between the node and the rectified output; and a second capacitor coupled between the node and circuit ground.

10. An apparatus, comprising:

a power converter operably connected to the first and second terminals, the power converter including a first inductive winding and a switching device, the power converter including a path forming a low impedance path to ground when voltage is first applied to the first and second input terminals;

a current limiting resistive device operably coupled between the second input terminal and circuit ground;

a first circuit configured to bypass the current limiting resistive device corresponding to the path having a high DC impedance at a time after voltage is first applied to the first and second input terminals.

11. The apparatus of claim 10, wherein the first circuit includes a current-controlled device having a load path coupled between the second input terminal an ground.

12. The apparatus of claim 11, wherein the first circuit includes a second circuit configured to generate a drive current when the first switch generates a switched output, the second circuit configured to provide the drive circuit to a control input of the current-controlled device.

13. The apparatus of claim 12, wherein the second circuit includes a second winding inductively coupled to the first inductive winding.

14. The apparatus of claim 13, wherein the second circuit includes a clamp circuit coupled between the second winding and the control input.

15. The apparatus of claim 14, wherein the clamp circuit further comprises a capacitor coupled between the second winding and the control input, and a diode coupled between circuit ground and at a point between the control input and the capacitor.

16. The apparatus of claim 10, wherein the power converter comprises a power factor correction circuit.

17. A power conversion circuit, comprising:

a bridge rectifier configured to be connected to a source of AC power, the bridge rectifier having first and second bridge outputs;

a conversion circuit operably connected to the first and second bridge outputs, the conversion circuit including a first inductive winding coupled between the first bridge output and a switching device;

a second winding inductively coupled to the first inductive winding;

a semiconductor switching device having a control input operably coupled to the second winding, the semiconductor switching device having a load path series-coupled between the second bridge output and circuit ground; and a current limiting resistive device operably coupled between the second bridge output and circuit ground.

18. The power supply of claim 17, further comprising:

a first resistor coupled to the control input;

a second resistor coupled between the control input and circuit ground;

a capacitor series connected to between the first resistor and the second winding;

a diode coupled between circuit ground and a point between the first resistor and the capacitor.

19. The power supply of claim 17, wherein the power conversion circuit includes a drive circuit having at least one switching frequency, the drive circuit operably coupled to drive the switching device.

20. The apparatus of claim 19, wherein the first inductive winding and the second winding form a transformer having a pass band that is above an input line frequency and includes the at least one switching frequency.

* * * * *